United States Patent Office 2,788,347
Patented Apr. 9, 1957

2,788,347

RESERPIC ACID LACTONE

Harold B. MacPhillamy, Madison, Arthur F. St. André, Morristown, and Charles F. Huebner, Chatham, N. J., assignors to Ciba Pharmaceutical Products, Inc., Summit, N. J., a corporation of New Jersey No Drawing. Application October 21, 1953, Serial No. 387,532

10 Claims. (Cl. 260—286)

The present invention relates to a new compound which is herein designated as reserpic acid lactone. The invention also embraces the acid addition salts of the aforesaid lactone and novel processes for the production thereof and conversion thereof into useful compounds.

The novel lactone can be prepared by various methods. In general, the process comprises lactonizing either reserpic acid or esters of reserpic acid in which the carboxyl group is esterified, for example, methyl reserpate. In general, reserpic acid can be lactonized to the lactone by treating it with a carboxylic acid anhydride or halide. The alkyl reserpates, e. g., methyl reserpate, lactonize to reserpic acid lactone when treated with Raney nickel catalyst in an inert solvent such as xylene, toluene and the like. The lactone is also obtained when an alkyl reserpate, e. g., methyl reserpate is subjected to an Oppenauer oxidation.

Reserpic acid and methyl reserpate are disclosed in the applications of Emil Schlittler, Serial No. 353,920, filed May 8, 1953, Serial No. 361,879, filed June 15, 1953, and Serial No. 376,984, filed August 27, 1953. Reserpic acid is prepared by subjecting reserpine to alkaline hydrolysis, and methyl reserpate by reacting the reserpic acid with diazomethane. The reserpine employed as the starting material can be obtained from plants of the Rauwolfia species, more particularly *Rauwolfia serpentina* Benth. according to the process described in the application of Emil Schlittler and Johannes Mueller, Serial No. 367,357, filed July 10, 1953, now Patent No. 2,752,351.

Reserpic acid has the empirical formula $C_{22}H_{28}O_5N_2$, and in addition to the free carboxyl group contains a free hydroxy group. It can be represented by the general formula

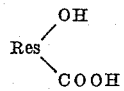

wherein Res stands for the divalent organic radical bound to the free hydroxyl and carboxyl groups in reserpic acid. By conversion of the carboxyl into a carbomethoxy group, as for example, by treating the reserpic acid with diazomethane, the carboxy group is esterified to form methyl reserpate which has the empirical formula $C_{23}H_{30}O_5N_2$. On lactonization, the hydroxy and carboxy or carbomethoxy groups react to form the reserpic acid lactone, which can be represented by the general formula:

Reserpic acid lactone may be treated with alcohols, e. g., methanol, ethanol and the like, to produce methyl reserpate or other alkyl reserpates. The free hydroxy group in the alkyl reserpates can be converted to acyloxy groups to form, for example, in the case of methyl reserpate, reserpine and other esters of the reserpates which are useful for example, methyl reserpate cinnamate, methyl reserpate veratrate, and methyl reserpate acetate as sedatives and/or hypotensive agents, as disclosed in the aforesaid application Serial No. 376,984.

The following examples will serve to illustrate the invention. The relationship of the parts by weight to the parts by volume being as the gram to the millimeter:

EXAMPLE 1

A suspension of 1.0 part by weight of methyl reserpate in 25 parts by volume of freshly distilled cyclohexanone was heated to boiling and 5.0 part by weight of aluminum phenolate was added. The mixture was refluxed for 44 hours. On cooling the solution was extracted five times with 100 parts by volume portions of 5% sulfuric acid. The combined acid extracts were filtered, made alkaline with 20% sodium hydroxide and then extracted five times with 60 parts by volume portions of chloroform. The combined extracts were washed with water, dried and the solvent removed leaving crystalline reserpic acid lactone. This was recrystallized from chloroform, M. P. 316–317° C.

Analysis calculated for: $C_{22}H_{26}O_4N_2$: C=69.09; H=6.85; N=7.33; $OCH_3$=16.2. Found: C=69.13; H=6.65; N=7.04; $OCH_3$=16.39.

The compound exhibits characteristic absorption bands in the infrared region of the spectrum when suspended in a hydrocarbon oil (Nujol) at the following frequencies expressed in reciprocal centimeters:

3332, 2946–2852 (broad band), 2789, 1773, 1724, 1630, 1600, 1573, 1509, 1479 (shoulder), 1465, 1449 (shoulder), 1430, 1382, 1367, 1357, 1341, 1329, 1312, 1304, 1272, 1260, 1237, 1224, 1215, 1200, 1187, 1176, 1158, 1132, 1124, 1103, 1086, 1067, 1053, 1036, 1025, 1019 (shoulder), 1000 (shoulder), 993, 988, 972, 956, 947, 927, 894, 883, 875, 837, 812, 801, 758, 731, 698, 690, 661, 663.

Instead of employing aluminum phenolate, aluminum tertiary butoxide may be employed in the above reaction.

EXAMPLE 2

A solution of 2.62 parts by weight of trimethoxybenzoic acid in 25 parts by volume of thionyl chloride was refluxed for 4 hours. The excess thionyl chloride was removed by distillation in vacuum. The crude trimethoxybenzoyl chloride remaining was dissolved in 15 parts by volume of dry pyridine and this was then added to a suspension of 1.0 part by weight of reserpic acid in 10 parts by volume of dry pyridine. The mixture was allowed to stand for five days. Water (50 parts by volume) was then added slowly and the solution made acid with 10% sulfuric acid. The aqueous acid solution was extracted with ether to remove unreacted trimethoxybenzoyl chloride. The aqueous phase was then adjusted to pH 6 with ammonium hydroxide and a precipitate formed. This was filtered, dried, worked up with ether and finally recrystallized from chloroform whereupon reserpic acid lactone was obtained.

EXAMPLE 3

0.5 part by weight of reserpic acid hydrochloride was warmed for a few minutes to effect solution in a mixture of 20 parts by volume of dry pyridine and 5 parts by volume of acetic anhydride. After about 16 hours the solution was concentrated to about 3 parts by volume in vacuo whereupon crystals of reserpic acid lactone hydrochloride separated. The hydrochloride is very soluble in water. It was recrystallized from methanol in which it is moderately soluble, M. P. 275° C., with decomposition. On treating the hydrochloride with ammonia, free reserpic acid lactone is obtained.

EXAMPLE 4

A suspension of 0.5 part by weight of methyl reserpate and 3 parts by weight of Raney nickel catalyst (which was well washed with ethanol) in 85 parts by volume of xylene, was refluxed overnight. The solution was filtered hot and the nickel catalyst washed well with hot benzene. The combined filtrate and washings were evaporated to dryness. The residue was dissolved in 150 parts by volume of benzene and chromatographed on 20 parts by weight of acid washed alumina. The fraction eluted with ether containing 5% methanol yielded reserpic acid lactone which was recrystallized from chloroform.

EXAMPLE 5

0.1 part by weight of reserpic acid lactone was added to a solution of 0.05 part by weight of sodium methylate in 25 parts by volume of methanol and the mixture refluxed for 1½ hours. The lactone was completely dissolved. The solution was cooled to room temperature, adjusted to pH 6–7 with 1:1 HCl and evaporated in vacuo to a volume of 2–3 parts. To this was added 25 parts by volume of water and the solution made to pH 4–5 with 1:1 HCl. Ammonia was added to pH 9–10 and the solution extracted four times with 15 parts by volume portions of chloroform. After drying over sodium sulfate the chloroform was evaporated in vacuo leaving a quantitive yield of methyl reserpate.

EXAMPLE 6

A mixture of 1.0 part by weight of reserpic acid lactone and a solution of sodium ethylate prepared by adding 0.015 part by weight of sodium to 40 parts by volume of absolute ethanol was heated under reflux for one hour to effect solution of the lactone. After standing overnight, the solution was adjusted to pH 1–2 with 1:1 HCl and concentrated to a volume of 10 parts. To this was added 40 parts by volume of water and the resulting solution adjusted to pH 9 with ammonia. The solution was extracted three times with chloroform and the chloroform extract dried over sodium sulfate. Evaporation of the chloroform left an amorphous residue which on recrystallization from acetone yielded ethyl reserpate, M. P 223–225° C.

The following example will serve to illustrate the preparation of reserpic acid, its hydrochloride, and methyl reserpate.

*Example A*

One part by weight of reserpine is refluxed with 40 parts by volume of N methanolic KOH, under nitrogen for 1½ hours. The solution is cooled, adjusted to pH 1–2 with 1:1 HCl (6 N HCl), and filtered to remove KCl. The filtrate is evaporated almost to dryness, slurried with two 25 parts by volume portions of ether and partially dissolved in 25 parts by volume of methanol. The methanol is evaporated almost to dryness and the residue again extracted with two 25 parts by volume portions of ether. The solid remaining is dissolved in 50 parts by volume of methanol, adjusted with N methanolic KOH to about pH 6 and evaporated almost to dryness. Addition of 50 parts by volume of chloroform dissolves the bulk of the solid, leaving KCl. Evaporation of the chloroform extract leaves crude reserpic acid which crystallized on the addition of a small amount of methanol and warming in a water bath. Ether is added dropwise to complete the crystallization and the crystals filtered and washed with ether. The reserpic acid thus obtained in the form of the hydrochloride melts at 255–258° C.

0.1 part by weight of reserpic acid hydrochloride is dissolved in 10 parts by volume of methanol and stirred with 0.125 part of powdered silver carbonate for 10 minutes. The solution is filtered to remove excess silver carbonate and the silver chloride formed, and the filtrate evaporated to dryness whereupon a pale yellow solid is obtained. Recrystallization from 1–2 parts by volume of methanol yields almost colorless crystals of reserpic acid, M. P. 239–245° C.

0.267 part by weight of reserpic acid is suspended in 25 parts by volume of methanol to which has been added 2 drops of water. 30 parts by volume of an ethereal solution containing 0.57 part by weight of diazomethane are added and the reaction mixture allowed to stand at room temperature for about 24 hours. The excess diazomethane and part of the ether are evaporated under nitrogen, and the solution further evaporated to a yellow oil in vacuo. On standing this crystallizes to a solid cake. On recrystallization from methanol, methyl reserpate is obtained.

The reserpine employed as a starting material can be obtained in the following manner as described in the above mentioned application Serial No. 367,357.

*Example B*

7,000 parts by weight of powdered bark from the root of *Rauwolfia serpentina* Benth. are percolated with about 35,000 parts by volume of methanol. After evaporating the methanol extract, 1,050 parts by weight are obtained of a dark colored powder which is treated several times with water for removal of soluble constituents. The insoluble residue remaining from this operation is subsequently masticated five times, in each case with 1,500 parts by volume of 10% aqueous acetic acid, the solution being best separated from the smeary residue by centrifuging. The brown acetic acid solution, which for further working up can be concentrated at low temperature to a small volume or be diluted with half the volume of water, possesses a pH of about 3.9. This solution is extracted by shaking with 3,500–4,000 parts by volume of chloroform divided into 3–4 portions. These chloroform extracts are washed once with potassium carbonate solution and twice with water, dried with sodium sulfate and evaporated to dryness under reduced pressure. The residue, amounting to 70–80 parts by weight, forms a green brown colored powder. For further purification this residue is dissolved in benzene and chromatographed over 1,000–1,200 parts by weight of neutral aluminum oxide (activity II–III according to Brockman). On elution with benzene there are first obtained small quantities of a yellow oil and 0.9 part by weight of an inactive crystallizate of melting point 238–239° C., after which the substance of sedative activity follows. As soon as the major quantity of the active substance has been eluted further elution is carried out with a mixture of 2 parts by volume of benzene and 1 part by volume of acetone. In this manner the residue of the sedative substance is obtained and after that a further inactive crystallizate of melting point 141–143° C. The eluate fractions containing the sedative substance are evaporated to dryness. By recrystallization of the residue from hot acetone or a mixture of chloroform and ether, 6.5–7 parts by weight of reserpine are obtained in the form of almost colorless crystals of melting point 262–263° C. (with decomposition), $[\alpha]_D^{23} -118°$ (in chloroform).

We claim:

1. A compound of the group consisting of reserpic acid lactone and the salts thereof.

2. Reserpic acid lactone.

3. Reserpic acid lactone hydrochloride.

4. A process which comprises lactonizing a member of the group consisting of reserpic acid, salts thereof, and esters thereof wherein the carboxyl group is esterified, and recovering reserpic acid lactone.

5. A process which comprises lactonizing methyl reserpate and recovering reserpic acid lactone.

6. A process which comprises lactonizing reserpic acid by reacting reserpic acid with a member of the group consisting of an acid anhydride and an acid halide.

7. A process which comprises subjecting methyl reserpate to Raney nickel so as to produce reserpic acid lactone.

8. A process which comprises subjecting methyl reserpate to an Oppenauer oxidation so as to produce reserpic acid lactone.

9. A process which comprises treating reserpic acid lactone with an alcohol so as to produce an ester of reserpic acid.

10. A process which comprises lactonizing a member of the group consisting of reserpic acid, salts thereof, and esters thereof wherein the carboxyl group is esterified, so as to produce reserpic acid lactone and treating the latter with an alcohol so as to form an ester of reserpic acid.

References Cited in the file of this patent

Dorfman et al.: Helv. Chim. Acta, vol. 37, pp. 59–75 (1954).